Sept. 18, 1945.　　　　J. E. MULHEIM　　　　2,385,022
DYNAMO-ELECTRIC MACHINE
Filed May 27, 1943
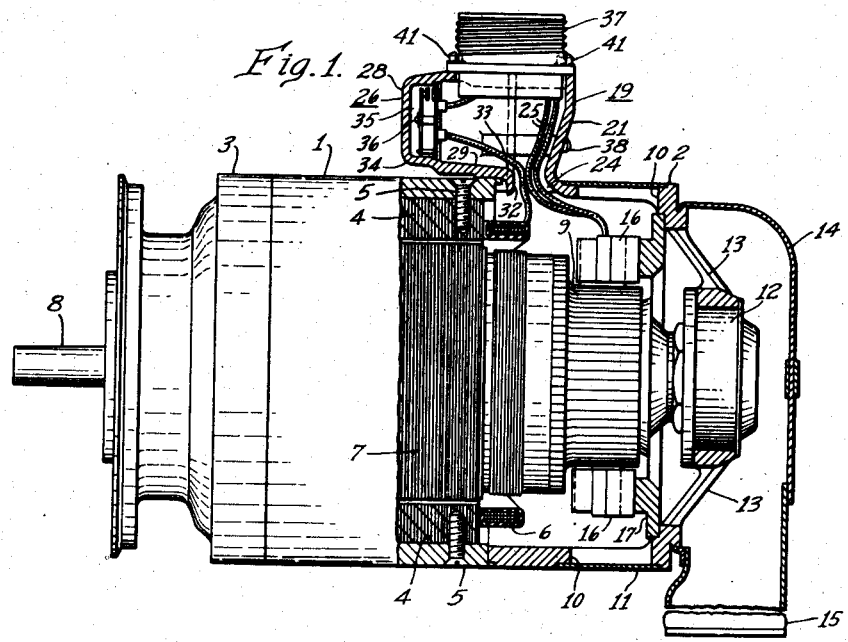
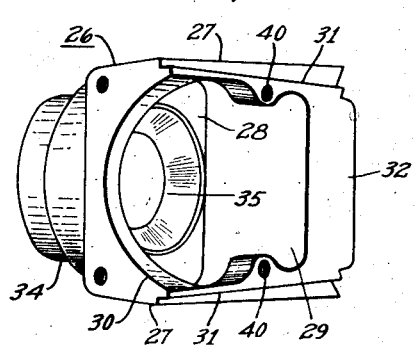
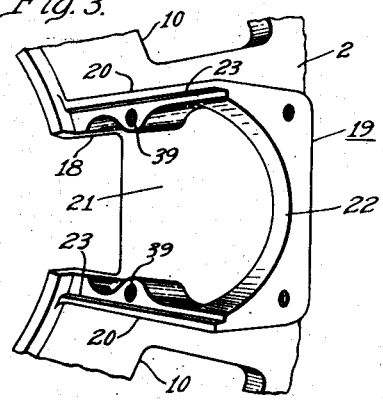
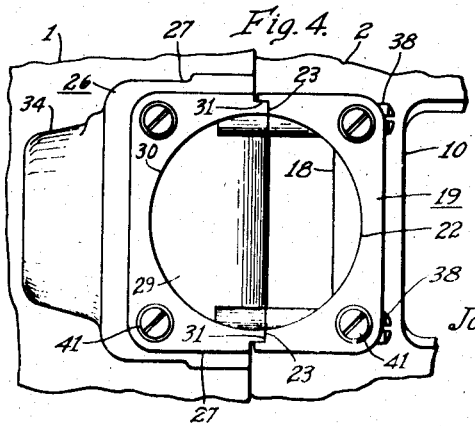
WITNESSES:
C. J. Weller
F. P. Lyle
INVENTOR
Joseph E. Mulheim.
BY O. B. Buchanan
ATTORNEY Patented Sept. 18, 1945

2,385,022

UNITED STATES PATENT OFFICE 2,385,022

DYNAMOELECTRIC MACHINE

Joseph E. Mulheim, Lima, Ohio, assignor to Westinghouse Electric Corporation, East Pittsburgh, Pa., a corporation of Pennsylvania Application May 27, 1943, Serial No. 488,628

5 Claims. (Cl. 171—252)

The present invention relates to the construction of dynamo-electric machines, and more particularly to an improved means for mounting a connector device on a dynamo-electric machine for connecting the machine to an external circuit.

Certain types of dynamo-electric machines, such as generators for use on aircraft, are usually connected to the external circuit by means of a separable connector, one element of which is mounted on the machine. It is necessary, especially for aircraft generators, for the mounting of this connector element to be strong and rigid in order to withstand the severe vibration to which the generator may be subjected in service, and it is also desirable for the mounting to be so designed that the generator can be disassembled without breaking any permanent electrical connections, in order to facilitate inspection and maintenance.

The principal object of the present invention is to provide a construction for dynamo-electric machines having a receptacle for receiving an element of a separable connector and for supporting it in position which will provide a strong and rigid mounting for the connector.

Another object of the invention is to provide a construction for dynamo-electric machines having a receptacle for the reception of an element of a separable connector, the receptacle being placed on an end bracket of the machine and so arranged that the machine can be readily disassembled for inspection and maintenance without breaking any permanent electrical connections.

A further object of the invention is to provide a dynamo-electric machine having a receptacle for the reception of a connector element which is designed so that a protective device for the machine can be mounted within the receptacle. It is often desirable to provide a protective device, such as a thermostat, to protect an aircraft generator against overloads or other abnormal conditions, and the present invention provides means for mounting such a protective device so that it is completely protected against damage from external causes, and is subjected to the heat of the generator so that it is effective to protect the generator against both excess current and any other conditions which may cause dangerous overheating.

Other objects and advantages of the invention will be apparent from the following detailed description, taken in connection with the accompanying drawing, in which:

Figure 1 is a longitudinal sectional view, partly in elevation, of a dynamo-electric machine embodying the invention, Fig. 2 is a perspective view of a half-receptacle, Fig. 3 is a fragmentary perspective view of a portion of an end bracket showing an integral half-receptacle, and Fig. 4 is a fragmentary plan view showing the complete receptacle.

The invention is shown in Fig. 1 embodied in a direct-current generator of the type used to supply the electrical load on aircraft, although it is to be understood that the invention is also applicable to other types of dynamo-electric machines. The generator shown in the drawing has a frame 1, of any suitable or usual construction, which is closed at the commutator end by an end bracket 2, and at the opposite end by an end bracket 3 of any suitable construction. A plurality of main pole pieces 4 are mounted on the frame 1 by means of mounting screws 5, and field windings 6 are placed on the pole pieces 4. The generator also has an armature 7 of any suitable type mounted on a shaft 8 and having a commutator 9 at one end positioned within the end bracket 2.

The end bracket 2 is sufficiently long in the axial direction to extend over the commutator 9 and may be secured to the frame 1 in any desired manner, as by screws. The end bracket 2 has a plurality of openings 10 about its periphery to permit access to the brushes, these openings being normally closed by a cover 11. The shaft 8 is supported in a bearing 12 in the end bracket 2, a similar bearing being mounted in the opposite end bracket 3, and openings 13 are provided in the end bracket 2 around the bearing 12 for the entrance of ventilating air. A hood or cover 14 may be attached to the end bracket 2 enclosing the openings 13, and having an air connection 15 to which an air duct or blast tube may be attached to provide a blast of ventilating air to obtain the most effective cooling of the generator. Suitable brush holders 16 are mounted on a rocker ring 17 which may be attached to the inside of the end bracket 2 in any desired manner.

The end bracket 2 has an opening or recess 18 formed in its periphery adjacent the frame 1, and a half-receptacle 19 is cast integral with the end bracket 2, partly enclosing the opening 18. As clearly shown in Fig. 3, the half-receptacle 19 has side walls 20 and a rear wall 21, so as to form a generally three-sided box-like structure around the opening 18. The top of the half-receptacle 19 has a semi-circular opening 22 and the front edges of the walls 20 are rabbeted, as indicated at 23. The rear wall 21 of the half-receptacle 19 is rounded at the bottom where it joins the bracket 2, as indicated at 24, in order to prevent any chafing or wear of the generator leads 25, which pass through the opening 18.

A separate half-receptacle 26 is provided for cooperation with the half-receptacle 19. As shown in Fig. 2, the half-receptacle 26 is a box-like structure having side walls 27, a rear wall 28 and a bottom wall 29. The top of the half-receptacle 26 has a semi-circular opening 30 corresponding in diameter to the semi-circular opening 22 of the integral half-receptacle 19. The front edges of the side walls 27 are rabbeted, as indicated at 31, to cooperate with the rabbets 23 of the half-receptacle 19, so that when the two half-receptacles are placed together, a tight fit between them is assured and a complete unitary receptacle is formed. The bottom wall 29 of the half-receptacle 26 has a downwardly extending lip 32 at its front edge, which is rounded where it joins the bottom wall 29, as indicated at 33. This rounded lip is adapted to extend over the edge of the frame 1 into the opening 18, as clearly shown in Fig. 1, so as to completely close the opening and prevent the entrance of dust or dirt into the machine through the opening 18. The rounded junction between the lip 32 and the bottom wall 29 serves to prevent any chafing or cutting of the leads 25 from the generator, which might be damaged if a sharp corner were present.

As previously explained, it is often desirable to provide a protective device for a generator of this type, and the half-receptacle 26 is designed to permit the mounting of such a device within it. For this purpose, the rear wall 28 of the half-receptacle 26 has a central depressed portion or boss 34, which forms an internal recess 35 in the rear wall of the half-receptacle. This recess 35 is made of sufficient size to receive a protective device 36, which is shown as a thermostatic device, although it will be apparent that any desired type of protective device could be used, and which is secured in position within the recess 35 by staking or any other suitable means.

When the generator has been assembled, the leads 25 are brought out through the opening 18 and attached to one element 37 of a separable connector. The half-receptacle 26, with the protective device 36 in position in it, is then put in place, the protective device 36 being first connected in the generator circuit in any desired manner, and the two half-receptacles are secured together, preferably by means of screws 38, which may pass through openings 39 in the half-receptacle 19 and engage in threaded holes 40 in the half-receptacle 26. The connector element 37 is received in the complete receptacle formed by the two halves, and is held in the circular opening formed by the two semi-circular openings 22 and 30, preferably being secured in position by screws 41. Thus, the connector 37 is rigidly and securely held in position by a strong and rigid mounting.

This construction offers several distinct advantages. The connector element 37 is rigidly and firmly held, and the leads 25 and protective device 36 are completely enclosed and protected by the receptacle. The arrangement is such that the generator can easily be disassembled for inspection and maintenance. Thus, the end bracket 2 and the rigging can be removed without interrupting any electrical connections except those from the brush holders to the field windings, which are usually made by means of clips held by screws on the brush holders, so that they are easily removed. In this manner, it is possible to completely disassemble the generator without breaking any permanent electrical connections. This is an important advantage, especially in generators for use on military aircraft, where ease and speed of maintenance are of great importance.

The provision of mounting space within the receptacle for a thermally responsive protective device for the generator is also an important feature of the invention, since it provides complete protection for the protective device by enclosing it in a strong, rigid structure which also encloses and protects the generator leads. Thus, the protective device can readily be connected in the generator circuit in the usual manner, and it is also subjected to the heat from the generator so that it is effective to protect the machine against both excess currents and any other abnormal condition which might cause dangerous overheating. The construction of the receptacle is very strong, since the half-receptacle 19 is cast integral with the end bracket 2, and this also has another advantage in that the integral half-receptacle 19 strengthens the end bracket and prevents any lack of rigidity which might otherwise result from the opening 18 in the periphery of the end bracket. Thus a strong and rigid construction is provided.

It should now be apparent that a construction has been provided for mounting a connector device, and, if desired, a protective device, on a dynamo-electric machine which provides a strong and rigid support for these devices, and which encloses and protects the protective device and the leads of the machine. It is to be understood that although a particular embodiment of the invention has been shown and described for the purpose of illustration, it is not restricted to the exact details of construction illustrated, but that in its broadest aspects it includes all equivalent modifications and embodiments which come within the scope of the appended claims.

I claim as my invention:

1. In a dynamo-electric machine having a frame, an end bracket at one end of the frame, said end bracket having an opening in its periphery adjacent the end of the frame, a generally box-like structure on the end bracket around said opening, said box-like structure being open on the side toward the frame, terminal leads for the machine extending through the opening in the end bracket, a connector device connected to said terminal leads for effecting connection of the leads to an external circuit, and a separate generally box-like member having an open side and adapted to cooperate with the first-mentioned box-like structure to form a receptacle enclosing the terminal leads, said connector device being received in said receptacle and rigidly held therein.

2. In a dynamo-electric machine having a frame, an end bracket at one end of the frame, said end bracket having an opening in its periphery adjacent the end of the frame, a generally box-like structure on the end bracket around said opening, said box-like structure being open on the side toward the frame, terminal leads for the machine extending through the opening in the end bracket, a connector device connected to said terminal leads for effecting connection of the leads to an external circuit, and a separate generally box-like member having an open side and adapted to cooperate with the first-mentioned box-like structure, means for securing said separate box-like member in position engaging the first-mentioned box-like structure to form a receptacle enclosing the terminal leads, and means for rigidly securing said connector device in said receptacle.

3. In a dynamo-electric machine having a frame, an end bracket at one end of the frame, said end bracket having an opening in its periphery adjacent the end of the frame, a generally box-like structure on the end bracket around said opening, said box-like structure being open on the side toward the frame, terminal leads for the machine extending through the opening in the end bracket, a connector device connected to said terminal leads for effecting connection of the leads to an external circuit, and a separate generally box-like member having an open side, said separate box-like member having a rounded lip extending downwardly from its open side and said separate box-like member being adapted to cooperate with the first-mentioned box-like structure to form a receptacle enclosing the terminal leads, means for securing the separate box-like member in position engaging the first-mentioned box-like structure with said lip extending into the opening in the end bracket, and means for rigidly securing said connector device in said receptacle.

4. In a dynamo-electric machine having a frame, an end bracket at one end of the frame, said end bracket having an opening in its periphery adjacent the end of the frame, a generally box-like structure on the end bracket around said opening, said box-like structure being open on the side toward the frame, terminal leads for the machine extending through the opening in the end bracket, a connector device connected to said terminal leads for effecting connection of the leads to an external circuit, and a separate generally box-like member having an open side, said separate box-like member having a depression in one wall forming a recess therein and being adapted to cooperate with the first-mentioned box-like structure to form a receptacle enclosing the terminal leads, a protective device for the machine mounted in said recess, means for securing the separate box-like member in position engaging the first-mentioned box-like structure, and means for rigidly securing said connector device in said receptacle.

5. In a dynamo-electric machine having a frame, an end bracket at one end of the frame, said end bracket having an opening in its periphery adjacent the end of the frame, a generally box-like structure on the end bracket around said opening, said box-like structure being open on the side toward the frame, terminal leads for the machine extending through the opening in the end bracket, a connector device connected to said terminal leads for effecting connection of the leads to an external circuit, and a separate generally box-like member having an open side, said separate box-like member having a rounded lip extending downwardly from its open side and having a depression in one wall forming a recess therein, a protective device for the machine mounted in said recess, said separate box-like member being adapted to cooperate with the first-mentioned box-like structure to form a receptacle enclosing the terminal leads, means for securing the separate box-like member in position engaging the first-mentioned box-like structure with said lip extending into the opening in the end bracket, and means for rigidly securing said connector device in said receptacle.

JOSEPH E. MULHEIM.